(12) United States Patent
Hoffmeier

(10) Patent No.: US 7,264,720 B2
(45) Date of Patent: Sep. 4, 2007

(54) POOL FILTER WITH A PRE-FILTERING UNIT

(75) Inventor: Dieter Hoffmeier, Ibbenbüren (DE)

(73) Assignee: Case GmbH, Hoerstel (DE)

( * ) Notice: Subject to any disclaimer, the term of this patent is extended or adjusted under 35 U.S.C. 154(b) by 0 days.

(21) Appl. No.: 10/526,056

(22) PCT Filed: Aug. 22, 2003

(86) PCT No.: PCT/DE03/02807

§ 371 (c)(1),
(2), (4) Date: Apr. 18, 2005

(87) PCT Pub. No.: WO2004/020343

PCT Pub. Date: Mar. 11, 2004

(65) Prior Publication Data

US 2005/0252842 A1    Nov. 17, 2005

(30) Foreign Application Priority Data

Aug. 30, 2002  (DE) .............................. 102 40 454

(51) Int. Cl.
*B01D 24/00* (2006.01)
(52) U.S. Cl. .................... 210/266; 210/316; 210/418
(58) Field of Classification Search .............. 210/266, 210/316, 418
See application file for complete search history.

(56) References Cited

U.S. PATENT DOCUMENTS

| 3,833,123 | A | * | 9/1974 | Walker | 210/241 |
| 3,884,811 | A | * | 5/1975 | Chattaway et al. | 210/169 |
| 3,957,634 | A |   | 5/1976 | Orensten et al. | 210/610 |
| 5,292,431 | A |   | 3/1994 | Romagnoli | 210/127 |
| 5,294,335 | A | * | 3/1994 | Chiang | 210/169 |
| 2004/0094470 | A1 |   | 5/2004 | Jackson | 210/411 |

FOREIGN PATENT DOCUMENTS

| EP | 0 958 850 | 11/1999 |
| GB | 2 146 255 | 4/1985 |
| GB | 2 307 421 | 5/1997 |
| GB | 2 367 506 | 4/2002 |
| GB | 2 371 244 | * 7/2002 |
| WO | WO 01 16034 | 3/2001 |

* cited by examiner

*Primary Examiner*—Duane Smith
(74) *Attorney, Agent, or Firm*—Cohen Pontani Lieberman & Pavane LLP

(57) ABSTRACT

The invention relates to a pool filter comprising a housing, which can be supported on a ground side on the base, a longitudinal axis and a transversal axis, and a water inlet, a channel outlet and a pool outlet which are embodied in the housing wall thereof. A flow path from the water inlet to the pool outlet is embodied in the housing on the filter in the filter system and a filter device is arranged in the flow path. The invention is characterised in that a pre-filtering unit is arranged in the flow path in front of the filter device.

15 Claims, 2 Drawing Sheets

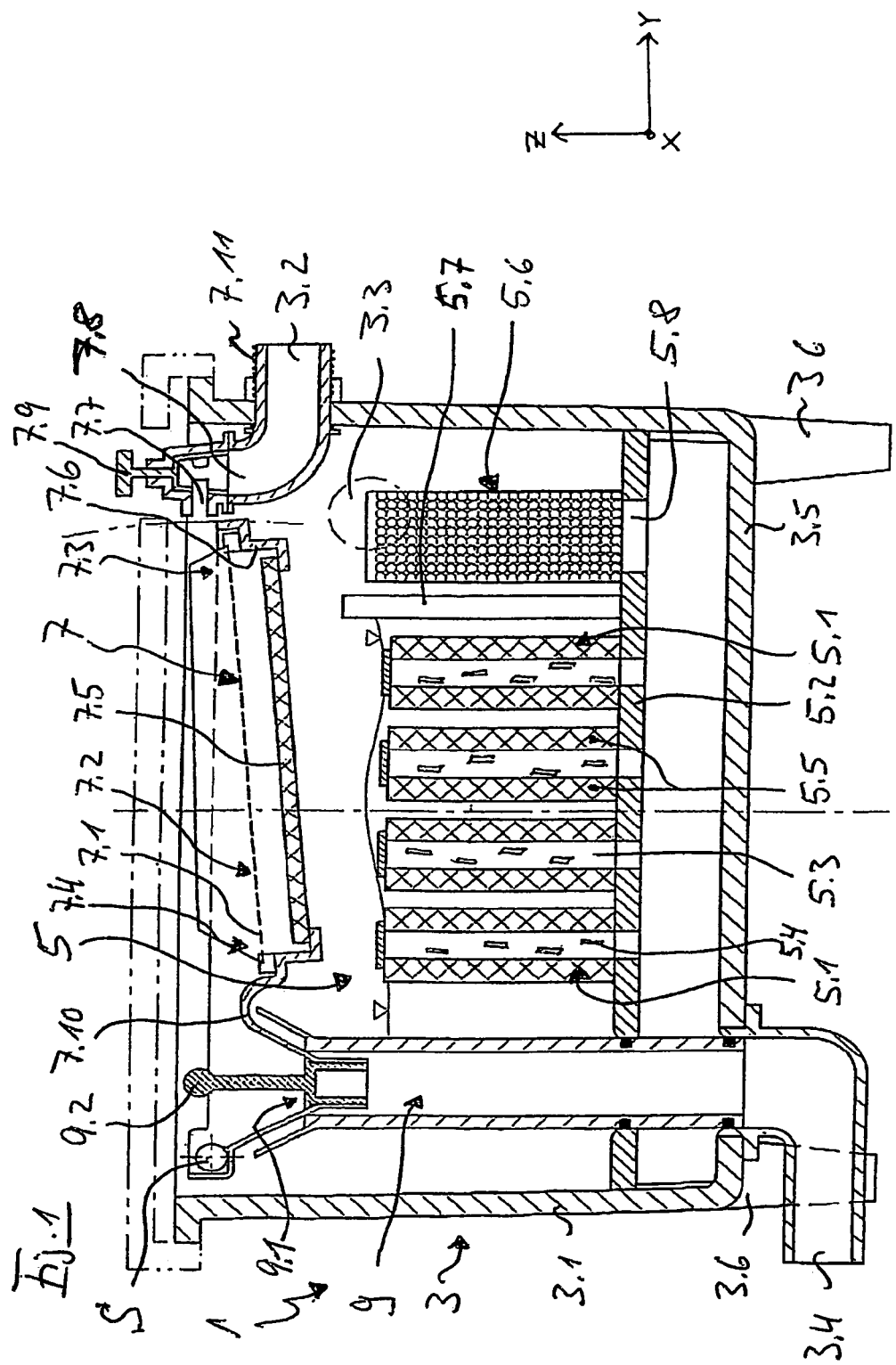

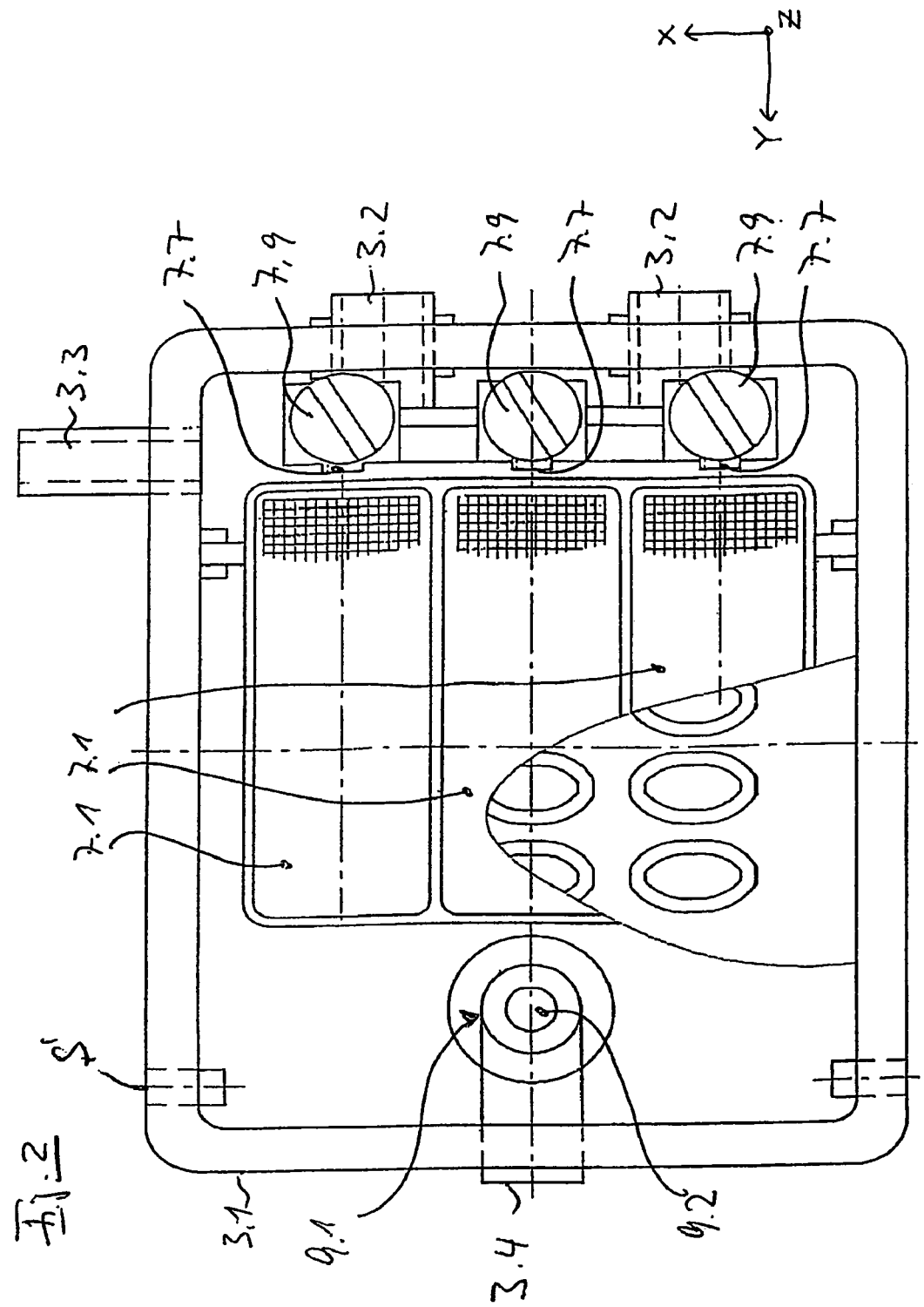

POOL FILTER WITH A PRE-FILTERING UNIT

PRIORITY CLAIM

This is a U.S. national stage of application No. PCT/DE2003/002807, filed on 22 Aug. 2003. Priority under 35 U.S.C. §119(a) and 35 U.S.C. §365(b) is claimed from German Application No. 102 40 454.2, filed 30 Aug. 2002.

BACKGROUND OF THE INVENTION

1. Field of the Invention

The present invention concerns a pond filter which has a pre-filtering unit and is installed in a housing.

2. Description of the Related Art

A pond filter of this type is already known from the general state of the art. A pond filter of this type is usually placed on the bottom of a pond and is downstream of a pump that pumps water into the pond filter to clean the water. The pond filter contains a filtration unit that catches suspended material contained in the water to be cleaned and sometimes also performs a biological purification with the addition of filter aids. The clean water is then discharged back into the pond at a pond outlet. It is also well known that a pond filter of this type has a channel outlet, through which water is discharged when the pond filter is being cleaned in a flushing operation.

However, it has been found that the filtration unit becomes clogged relatively quickly in the filtration operation described above, even though the water coming from a pump has already been subjected to coarse filtration by a coarse filter at the pump. As a result, the filtration operation must be interrupted relatively frequently to clean the filtration unit. Frequent cleaning of the filtration unit is inconvenient, because it requires that the pond filter be removed from the pond.

SUMMARY OF THE INVENTION

Therefore, the objective of the present invention is to develop a pond filter whose filtration unit becomes clogged less quickly and thus requires cleaning only at relatively long intervals of time.

In accordance with the invention, this objective is achieved by installing a pre-filtering unit in the flow path upstream of the filtration unit.

The installation of a pre-filtering unit has the advantage that suspended particles of a predetermined size, for example, 100-250 μm, can be trapped and thus not enter the actual filtration unit.

Another advantage of the present invention is that the pre-filtering unit comprises a filter screen with a flat construction. A flat filter screen can be provided with predetermined filter openings, depending on the water to be cleaned.

Another advantage is that the filter screen is arranged parallel to the transverse axis and at an angle to the longitudinal axis in such a way that the filter screen has an end that is close to the ground and an end that is distant from the ground. Due to this oblique positioning in the flow path, the water passes through screen openings, and its flow gradually pushes the filtered material that has collected on the filter screen towards the end near the ground. In this way, even the filter screen of the pre-filtering unit remains free of filtered material over a large portion of its area for a relatively long period of time.

Another advantage of the present invention is that the pre-filtering unit has a diverting device installed in the flow path between the water intake and the filter screen. With a diverting device of this type, the intake water can be diverted towards the filter screen.

Another advantage of the present invention is that the diverting device is installed parallel to the transverse axis and forms a flow chamber, which has at least one outlet above the end of the filter screen that is distant from the ground, in such a way that intake water strikes the end of the filter screen that is distant from the ground and flows along the oblique filter surface towards the end that is close to the ground, and flows down by gravity into the filtration unit through filter openings in the filter screen. Due to the arrangement of at least one outlet above the end that is distant from the ground, the intake water is guided tangentially towards the filter screen, so that a better pushing effect on filtered material possibly adhering to the filter screen is achieved.

Another advantage of the present invention is that the flow chamber has one or more diverting elements, each of which is associated with an outlet. With a diverting element, the flow path of the intake water can be concentrated on one region of the filter screen, so that the pressure of the intake water is increased in this region and acts to rinse the filter screen. Additional advantages are apparent from the features specified in the dependent claims.

BRIEF DESCRIPTION OF THE DRAWINGS

FIG. 1 shows a schematic side view in the form of a longitudinal section through a pond filter of the invention.

FIG. 2 shows a schematic top view of the pond filter in FIG. 1 with the cover removed to reveal the prefiltration unit and with the prefiltration unit partly cut away to reveal the filtration unit beneath it.

DETAILED DESCRIPTION OF THE PRESENTLY PREFERRED EMBODIMENTS

FIG. 1 shows a schematic side view of a pond filter as a longitudinal section. The pond filter 1 has a housing 3 with a housing wall 3.1, in which a water inlet 3.2, a pond outlet 3.3, and a channel outlet 3.4 are formed. During the filtration operation, a flow path is formed in the housing 3, which runs between the water inlet 3.2 and the pond outlet 3.3. During the flushing operation, a flow path is formed in the housing 3, which runs between the water inlet 3.2 and the channel outlet 3.4.

The housing 3 has a transverse axis X and a longitudinal axis Y. A direction perpendicular to the longitudinal axis Y and perpendicular to the transverse axis X is denoted the Z direction. The housing 3 has a bottom 3.5, on which feet 3.6 are constructed to support the housing 3 on a foundation. The water inlet 3.2 is formed at an end of the housing 3 in the Z direction that is distant from the ground. The pond outlet 3.3 is also formed in a part of the housing 3 in the Z direction that is distant from the ground. The channel outlet 3.4 is formed at an end of the housing 3 in the Z direction that is close to the ground.

A filtration unit 5 is installed in a central region of the housing 3. The filtration unit 5 comprises a large number of filter cartridges 5.1, which are spaced some distance apart and extend in the Z direction from a mounting 5.2. The mounting 5.2 runs parallel to the transverse axis X and parallel to the longitudinal axis Y. Each filter cartridge 5.1 has a central flow channel 5.3, which is closed at the end that is distant from the ground and has lateral outlet slits 5.4. A porous, permeable, and compressible material 5.5 is arranged around the central flow channel 5.3. With a suitable tool (not shown), the filter material can be squeezed or compressed in the Z direction along the central flow channel 5.3 in order to squeeze out filtered material present in it during the flushing operation.

The filtration unit 5 optionally includes a supplementary cartridge 5.6, which contains a filter aid, for example, activated carbon, zeolite, lava rock, bio-core, or the like. As shown in the present example, the supplementary cartridge 5.6 can be spatially separated from the filter cartridges 5.1 by a partition 5.7. In other embodiments, however, it is possible for individual filter cartridges 5.1 to be replaced by a supplementary cartridge 5.6.

A flow channel is formed between the ground side 3.5 and the mounting 5.2. During filtration operation, the water that has passed through the filter cartridges can flow through this flow channel towards the pond outlet 3.3. In the present embodiment, the water is forced through an opening 5.8 in the Z direction through the supplementary cartridge 5.6 to the pond outlet 3.3 at the top.

A pre-filtering unit 7 is installed in the space above the filtration unit 5. The pre-filtering unit 7 extends parallel to the transverse axis X and at an angle of inclination to the longitudinal axis Y. As a result of this arrangement, as FIG. 1 shows, the pre-filtering unit has an end that is distant from the ground on the right side in FIG. 1 and, on the opposite side, i.e., on the left side in FIG. 1, an end that is close to the ground. The angle of inclination is relatively small.

The pre-filtering unit comprises a filter screen 7.1, which can be made of any desired material but is preferably made of high-grade steel. The filter screen 7.1 has filter openings, whose size can be freely selected. In the present embodiment, the filter openings 7.2 have a size of 100-250 µm. The filter screen 7.1 also has an end 7.3 that is distant from the ground and an end 7.4 that is close to the ground. A large-pored plastic mat 7.5 is arranged below the filter screen 7.1. The water that has passed through the filter screen 7.1 trickles through the plastic mat 7.5 and can absorb oxygen for nitrification. The filter screen 7.1 and the large-pored plastic mat 7.5 are supported in the pre-filtering unit 7 in a mounting 7.6.

The prefiltration unit 7 encloses a flow chamber 7.8 between the water inlet 3.2 and the filter screen 7.1. The water inlet 3.2 in the flow chamber 7.8 can be formed as a single or multiple part. FIG. 2 shows two inlets 3.2 into the flow chamber 7.8. The flow chamber 7.8 is formed parallel to the transverse axis X and extends essentially the width of the filter screen 7.1 in the direction of the transverse axis X.

In the present embodiment, the filter screen 7.1 is designed in three parts, as FIG. 2 shows. In other embodiments, the filter screen 7.1 can be designed as a single part, or it can have more than three parts. The filter screen 7.1 is divided parallel to the longitudinal axis Y, so that three oblong filter screen parts are formed. Outlet openings 7.7 are formed in the flow chamber 7.8. Each outlet opening 7.7 is assigned to one part of the filter screen 7.1. However, in the case of a one-part filter screen 7.1, several outlet openings 7.7 can also be provided, all of which are then assigned to the one-part filter screen 7.1. In the present invention, at least one outlet opening 7.7 should be assigned to a filter screen part.

Each outlet opening 7.7 has a diverting element 7.9. The diverting element 7.9, which can be, for example, a tapered plug, can be used to close certain outlet openings 7.7, so that the flow of the intake water is concentrated at certain open outlet openings 7.7. For example, in the embodiment shown in FIG. 2, two outlet openings 7.7 can be closed, so that the intake water can flow through the third, open outlet opening 7.7 to the corresponding part of the filter screen 7.1. This triples the pressure of the water tangentially striking the screen part 7.1 and produces a rinsing effect on the surface of the corresponding part of the screen 7.1.

Due to the oblique arrangement of the filter screen 7.1, the water forces the filtered material that has collected on the filter screen 7.1 towards the end 7.4 that is close to the ground. The water itself passes through the filter openings 7.2 by gravity and trickles through the plastic mat 7.5 and into the actual filtration unit 5.

A flushing channel 9 is formed in the housing 3 and runs in the Z direction. The flushing channel 9 is connected to the channel outlet 3.5. The flushing channel 9 has an inlet opening 9.1. A flow barrier 7.10 is constructed between the inlet opening 9.1 and the end 7.4 of the filter screen that is close to the ground. The flow barrier 7.10 is part of the mounting 7.6 and extends parallel to the transverse axis X over the entire width of the filter screen 7.1. It blocks the flow path of the intake water in the direction of the longitudinal axis Y during normal filtration operation. During a flushing operation, in which the water flowing in through the water inlet 3.2 is concentrated at one outlet opening 7.7, the strong flow of water, together with the filtered material it is carrying, can overcome the barrier to reach the inlet opening 9.1 into the flushing channel 9. During normal filtration operation, the inlet opening 9.1 is closed by a closing device 9.2, for example, a stopper. This ensures that water and filtered material that have passed by the flow barrier 7.10 even during normal filtration operation are collected in a funnel-shaped structure of the mounting 7.6 and can pass through the flushing channel 9.1 and out through the channel outlet 3.4 only during a flushing operation, after removal of the stopper 9.2.

In the present embodiment, the mounting 7.6 is supported on the housing wall 3.1 in such a way that it can swivel about an axis of rotation S. In other embodiments, the whole prefiltration unit 7 is supported in such a way that it can swivel about the axis of rotation S. Due to the rotatable support of the mounting 7.6, the filter screen 7.1 and the large-pored plastic mat 7.5 can be swiveled from an almost horizontal operating position during the filtration operation into an essentially vertical position and vice versa. This swiveling mechanism makes it easy to gain access to the filtration unit 5, which lies beneath the prefiltration unit 7, when the filtration unit 5 is to be cleaned.

The connection of the flushing channel 9 with the channel outlet 3.5 is releasable, so that the flushing channel 9 can be pulled up in the Z direction. This causes the flushing channel 9 near the ground to open between the mounting 5.2 and the ground side 3.5 of the housing 3 towards the channel outlet 3.4. In this position (not shown) of the flushing channel 9, the filtration unit 5 can also be flushed, so that the flow path does not run in the direction of the pond outlet 3.3 but rather in the direction of the channel outlet 3.4.

The flow chamber 7.8 of the prefiltration unit 7 can also have a hose connection 7.11 for flushing water. A UV-C lamp can be installed upstream of the flow chamber 7.8, so that the water to be purified is disinfected before it enters the filter.

What is claimed is:

1. A pond filter comprising:
   a housing having a bottom which can be supported on a foundation, and a wall provided with a water inlet, a channel outlet, and a pond outlet, the housing having a transverse X axis and a longitudinal Y axis defining an XY plane which is parallel to the foundation when the bottom is supported on the foundation;
   a flow path between the water inlet and the pond outlet;
   a prefiltration unit installed in the flow path and comprising a flat filter screen which is parallel to the X axis and at an acute angle to the Y axis, thereby defining an upper end and a lower end of the screen;
   a flushing channel connected to the channel outlet and having an inlet opening;
   a flow barrier disposed between the filter screen and the inlet opening of the flushing channel, the flow barrier extending parallel to the X axis over the entire width of the filter screen, wherein the flow barrier is arranged to block intake water in the Y axis during filtration and is overcome by intake water in the Y axis during flushing; and
   a filtering device in the flow path downstream of the prefiltration unit.

2. The pond filter of claim 1, further comprising a flow diverting device arranged in the flow path between the water inlet and the flat filter screen.

3. The pond filter of claim 2, wherein the flow diverting device comprises a flow chamber arranged parallel to the X axis, the flow chamber having at least one outlet opening proximate to the upper end of the filter screen, whereby water flows along the screen toward the lower end and through the screen.

4. The pond filter of claim 3, wherein the flow diverting device comprises a plurality of outlets proximate to the upper end of the screen, and a plurality of flow diverting elements arranged adjacent to respective said outlets.

5. The pond filter of claim 4, wherein the filter screen comprises a plurality of screen parts, each said screen part being adjacent to a respective said outlet.

6. The pond filter of claim 5, wherein each said diverting element can divert water to one or more of said screen parts.

7. The pond filter of claim 1, wherein the filter screen comprises a plurality of screen parts extending along the X axis.

8. The pond filter of claim 1, wherein the inlet opening of the flushing channel can be closed for filtration and opened for flushing.

9. The pond filter of claim 1, wherein the inlet opening has a cross section shaped like a funnel parallel to the Y axis.

10. The pond filter of claim 1, wherein the prefiltration unit is pivotable with respect to the housing.

11. The pond filter of claim 10, wherein the prefiltration unit is pivotable about a pivot axis which is parallel to the X axis.

12. The pond filter of claim 11, wherein the pivot axis is located above the flushing channel.

13. The pond filter of claim 1, wherein the flushing channel can be disconnected from the channel outlet so that the filtering device can be flushed along a flow path from the filtering device to the channel outlet.

14. The pond filter of claim 1, wherein the filtering device comprises a plurality of filter cartridges which are compressible for cleaning purposes.

15. The pond filter of claim 1, wherein the filtering device comprises a cartridge containing at least one filtering aid selected from the group consisting of activated carbon, zeolite, and lava rock.

* * * * *

UNITED STATES PATENT AND TRADEMARK OFFICE
CERTIFICATE OF CORRECTION

PATENT NO.       : 7,264,720 B2
APPLICATION NO.  : 10/526056
DATED            : September 4, 2007
INVENTOR(S)      : Dieter Hoffmeier It is certified that error appears in the above-identified patent and that said Letters Patent is hereby corrected as shown below:

The listing of the assigned on the title page should be as follows:

(73) Assignee: Oase GmbH, Hoerstel (DE)

Signed and Sealed this

Eighteenth Day of December, 2007

JON W. DUDAS
*Director of the United States Patent and Trademark Office*